July 22, 1941. E. L. DAYTON 2,250,011
SEALING MEANS FOR HYDRAULIC VALVE TAPPET CONSTRUCTION AND THE LIKE
Filed Oct. 20, 1938

INVENTOR
ERNEST L. DAYTON
BY
Whittemore Hulbert Belknap
ATTORNEYS

Patented July 22, 1941

2,250,011

UNITED STATES PATENT OFFICE 2,250,011

SEALING MEANS FOR HYDRAULIC VALVE TAPPET CONSTRUCTION AND THE LIKE

Ernest L. Dayton, Detroit, Mich.

Application October 20, 1938, Serial No. 235,951

11 Claims. (Cl. 309—34)

This invention relates to sealing means of the type associated with relatively slidable parts to restrict the escape of fluid between the engaging surfaces of the parts, and refers more particularly to a seal applicable to hydraulic valve tappet constructions to prevent the escape of fluid past the piston.

One of the principal objects of the present invention consists in the provision of sealing means rendering it possible to effect a fluid-tight seal between relatively slidable telescopically engaging parts without the necessity of fashioning the slidably engaging surfaces of the parts to extremely close limits.

Another advantageous feature of this invention resides in the provision of sealing means movable with one of the parts and having a portion frictionally engageable with the other part in a manner to provide a fluid-tight seal between the parts without appreciably increasing the friction offered to relative sliding movement of the parts.

Another object of this invention resides in the provision of sealing means in the form of a cup-shaped member equipped with a ductile metal annular flange having a cylindrical surface slidably engaging the adjacent surface of one of the parts and having a lip at the free edge normally yieldably urged into frictional engagement with the surface of the part aforesaid.

Still another feature of the present invention consists in the provision of a seal of the character set forth in the preceding paragraph wherein the lip of the ductile flange is yieldably urged into frictional engagement with the adjacent surface throughout the circumference of the lip to insure the provision of a fluid-tight seal between the lip and said surface.

A further object of the present invention consists in the provision of a seal assembled in a hydraulic valve tappet to move as a unit with the piston and in a manner that any foreign matter in the fluid is embedded in the ductile lip of the seal. As a result, the foreign matter is prevented from lodging in the clearance provided between the piston and cylinder where it would have a tendency to score the adjacent surfaces of the latter members.

A further advantageous feature of this invention consists in the provision of a seal for use in a fluid operated valve tappet construction which permits the limited escape of fluid past the piston required to allow a contraction of the tappet necessary to compensate for the expansion of the valve mechanism due to heat rise in temperature resulting from repeated operation of the tappet.

Still another object of this invention consists in providing the ductile sealing member with a relatively hard protection element effective to resist spreading of the ductile member and the consequent binding of the ductile ring upon relative movement of the parts.

A still further feature of the present invention consists in the provision of a valve tappet assembly having a ductile metal ring at the upper end of the piston frictionally engageable with the inner wall of the cylinder and effective to collect any foreign particles in the fluid tending to escape past the piston.

In addition to the foregoing, the present invention contemplates novel means for preventing relative rotative movement of the piston and cylinder. This feature is advantageous in that it not only prevents scoring either the piston or cylinder by any foreign particles that may become lodged between the latter, but also prevents elongation beyond desired limits, as well as simplifies shipment and assembly.

The foregoing, as well as other objects, will be made more apparent as this description proceeds, especially when considered in connection with the accompanying drawing, wherein:—

Figure 1:
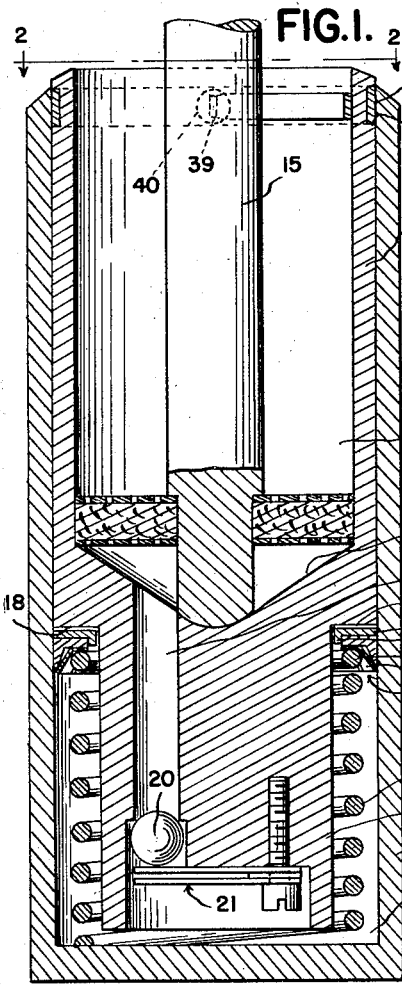
Figure 1 is a vertical sectional view through a hydraulic tappet equipped with a sealing means forming the subject matter of this invention.
Figure 2:
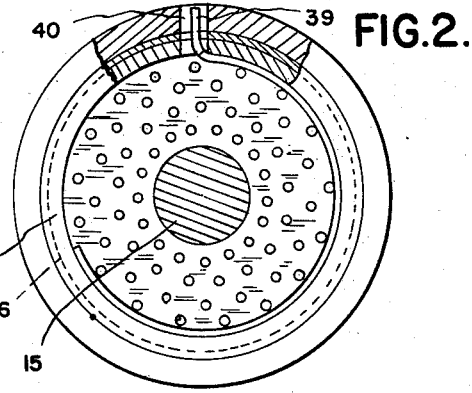
Figure 2 is a cross sectional view taken substantially on the plane indicated by the line 2—2 of Figure 1.

Although my improved sealing means may be advantageously employed in practically any installation where it is desired to provide a fluid-tight seal between relatively slidably telescopical engaging parts, nevertheless, particularly satisfactory results have been obtained by use of the seal in a hydraulic valve tappet assembly and, accordingly, I have selected the latter assembly for the purpose of illustrating this invention. The advantages of a hydraulic valve tappet have been known to the trade for a long period of time, and the principal reason why this type of tappet has not received greater commercial success has been due to the exceedingly high cost of manufacture of this type of tappet. The high cost of manufacture of hydraulic tappets is due primarily to the necessity of machining the piston and cylinder to extremely close limits in order to provide the restriction to the leakage of the fluid medium required for successful operation. The present invention renders it possible to obtain highly efficient operation of a hydraulic valve tappet without the necessity of holding the relatively slidable parts to extremely close limits and, accordingly, permits commercially manufacturing hydraulic valve tappets at a cost considerably lower than heretofore believed possible.

In the interests of simplicity, I have selected, for the purpose of illustration, a hydraulic valve tappet having substantially the same principle of operation as the one defined in my Patent No. 2,158,222, dated May 16, 1939. Briefly described, the hydraulic valve tappet illustrated in Figure 1 comprises a cylinder 10 closed at its lower end for engagement with a suitable cam (not shown) and open at its upper end. Slidably mounted in the cylinder 10 is a piston 11 having a reduced portion 12 at the lower end forming a chamber 13 in the bottom of the cylinder and having a recess 14 open at its upper end to receive the fluid medium. It will also be observed from Figure 1 that a rod 15 extends into the recess 14 with the lower end abutting the bottom wall 16 of the recess and with the upper end, either directly or indirectly connected to one of the valves (not shown) of the engine.

Located within the chamber 13 is a coil spring 17 surrounding the reduced portion 12 of the piston with the lower end engaging the bottom wall of the cylinder and with the upper end exerting a pressure on the annular shoulder 18 formed by the reduced portion 12 of the piston. By virtue of this construction, it will be noted that the spring 17 normally urges the piston 11 upwardly to maintain the wall 16 of the recess 14 into engagement with the lower end of the rod 15 and to take up any slack between the engine valve (not shown) and the piston. The lengths of the rod 15 and the piston 11 are such that the piston is always supported above the bottom of the cylinder 10, either by hydaulic medium in the chamber 13, or by the spring 17, or by both the hydraulic medium and spring.

The chamber 13 is supplied with the hydraulic medium from the recess 14 by a passage 19 formed in the reduced portion 12 of the piston and enlarged at its lower end to receive a ball type check valve 20. The valve 20 is normally held in its closed position wherein communication between the passage and chamber 13 is prevented by means of a dual spring device 21 described in detail in my above identified copending application. It will suffice to point out that the dual spring 21 opposes opening movement of the valve with varying degrees of resistance and thereby insures efficient operation at different speeds of the operating cam (not shown).

With the construction as thus far described, it will be noted that any upward movement of the piston 11 with respect to the cylinder 10 is accompanied by a flow of the fluid medium from the recess 14 in the piston through the passage 19 to the chamber 13. This action takes place whenever it is necessary to absorb any lost motion between the operating cam (not shown) and the engine valve (not shown). The hydraulic medium flowing through the passage 19 into the chamber 13 is prevented from returning to the recess 14 by the check valve 20 and, consequently, the resulting elongation of the tappet effected by upward movement of the piston 13 in the cylinder is maintained, with the result that the engine valve (not shown) will receive the full throw of the cam. The rapid operations to which the tappet is subjected by the action of the cam causes a slow leakage of the hydraulic medium from the chamber 13 past the piston. A restricted amount of leakage past the piston is essential in order to permit the tappet to contract in proportion to the expansion of the tappet by the heat generated so as to avoid holding the engine valve (not shown) off its seat.

Although any tendency for lost motion to exist in the operative connection between the cam (not shown) and the engine valve (not shown) by the escape of an excess amount of fluid from the chamber 13 is immediately taken up by upward movement of the piston 11 under the action of the spring 17, nevertheless, it is essential to definitely restrict the escape of fluid from the chamber 13 in order to insure satisfactory operation of the tappet. In accordance with the present invention, the escape of fluid from the chamber 13 is definitely restricted to within the limits consistent with satisfactory operation without the necessity of providing an extremely accurate fit between the piston 11 and the side walls of the cylinder. In the embodiment of the invention illustrated in Figures 1 to 5, inclusive, the quantity of fluid escaping from the chamber 13 is controlled by a seal 22 located between the upper end of the spring 17 and the shoulder 18 on the piston 11. In detail, the seal 22 comprises an inverted cup-shaped ring 23 formed of a ductile metal and provided with an axially extending depending flange 24 having a cylindrical exterior surface frictionally engageable with the cylinder walls. The interior surface of the flange 24 is tapered outwardly from the base of the ring to provide a lip 25 having a wiping engagement with the cylinder walls. The base of the ring is seated against the bottom surface of the ring 27 preferably formed of a relatively hard metal and having the central portion extruded to provide a hub 28 sleeved into the central opening in the ductile sealing ring 23. The upper surface of the ring 27 engages the annular shoulder 18 and the central opening of the hub 28 is, of course, of sufficient diameter to freely receive the reduced portion 12 of the piston.

The lip 25 of the ductile sealing ring is yieldably urged into frictional engagement with the cylinder wall by means of an inverted cup-shaped spring member 29 located in the sealing ring 24 with the base 30 in abutting engagement with the undersurface of the base portion of the sealing ring 23. The depending flange of the cup-shaped spring is fashioned to provide a plurality of spring fingers 31 having the bottom or free edges engageable with the inner surface of the lip 25 on the ductile sealing ring 23 in such a manner as to exert an outward pressure on the lip sufficient to urge the outer surface of the lip into frictional engagement with the cylinder wall. In other words, the diameter of the lower edge of the cup-shaped spring exceeds the internal diameter of the lip 25 on the ductile sealing ring, with the result that the spring 29 is under tension when assembled in the cup-shaped sealing ring 23. Attention is also called to the fact at this time that the spring fingers have a substantially continuous circumferential engagement with the lip and that the action of these fingers is such as to apply a substantially uniform pressure on the lip to effect a continuous engagement of the outer surface of the lip with the cylinder throughout the circumference of the lip. Inasmuch as the spring pressure is concentrated on the lip at the free edge of the latter, this edge will have an effective wiping action on the cylinder walls during movement of the piston. Also, it will be noted that the combination of the particular spring shown and the soft metal employed in the sealing ring provides an arrangement where the lip will readily conform to the cylinder walls and compensate for any out of roundness that may exist in the cylinder wall or any variation in the diameter of the latter.

The spring 29, sealing ring 23, and protecting ring 27 are maintained in the position thereof shown in Figure 1 against the shoulder 18 on the piston 11 by means of the spring 17. The upper end of the spring 17 abuts the base 30 of the cup-shaped spring 29 so that, in effect, the base 30 forms a protecting member for the relatively high ductile sealing ring 23. With the depth of the sealing ring located in the position described, the same is, of course, subjected to the working pressures and, for this reason, care is taken in selecting the alloy from which the sealing ring is formed. Particularly satisfactory results have been obtained by a sealing ring formed of an alloy of tin base bearing metal. In any event, the sealing ring should have a malleable rating sufficiently high to prevent creeping under the working pressure and should preferably have a ductile rating sufficient to allow expansion under a pressure so light as to offer no appreciable resistance to relative sliding movement between the piston and cylinder. In addition, the alloy from which the ductile ring is fashioned is so selected that the ring has no definite elastic limit, with the result that it will not return to any set shape, once it is urged into snug engagement with the cylinder walls.

It will be understood from the above that a highly effective seal is provided at the lip 25 of the ring 23 preventing escape of fluid from the chamber 13 past the lip to the clearance existing between the piston and cylinder. However, for reasons hereinbefore given, it is essential to permit a limited escape of fluid from the chamber 13 past the piston 11 in order to provide for the contraction of the tappet necessary to compensate for elongation caused by heat. This is accomplished, in the present instance, by providing restricted recesses 33 in the top surface of the ring 27. These recesses extend from the central opening through the ring 27 to the periphery of the latter and are of a size to insure by-passing a sufficient quantity of fluid from the chamber 13 around the seal 22 to compensate for any elongation of the parts of the tappet.

The location of the ductile metal sealing ring 23 in the assembly is of importance in that any foreign matter existing in the oil and adhering to the side wall of the cylinder below the lip becomes embedded in the ductile metal. As a result, this foreign matter is prevented from scratching or scoring the adjacent slidably engaging surfaces, and this is of particular importance in the present instance where it is essential to maintain a tight seal. For the same purpose, a relatively soft metal ring 36 is embedded in a groove 37 at the upper end of the piston in a position to frictionally engage the cylinder wall. This metal ring will also serve to arrest or collect any metal filings or foreign matter that would otherwise have a tendency to escape past the piston and impair the operation of the latter.

It has also been stated that one of the features of this invention consists in preventing relative rotative movement between the piston and cylinder. This is accomplished, in the present instance, by providing a spring 38 located under tension in the upper end of the piston recess 14 and having a lateral projection 39 at one end extending through aligned openings 40 formed in the adjacent side wall of the recess 14 and cylinder 10. The aligned openings 40 are of sufficient diameter to permit the elongation of the tappet necessary for all operative conditions without interference by the projection 39. Attention is called to the fact that the pin 39 will hold the several parts of the tappet in assembled relation during shipping and installation which is highly advantageous from the standpoint of ease in assembling the tappet in the engine. Also, the pin 39 restricts elongation of the tappet in the event the engine valve should stick during operation of the engine and thereby prevent serious damage to the engine parts.

Figure 6:
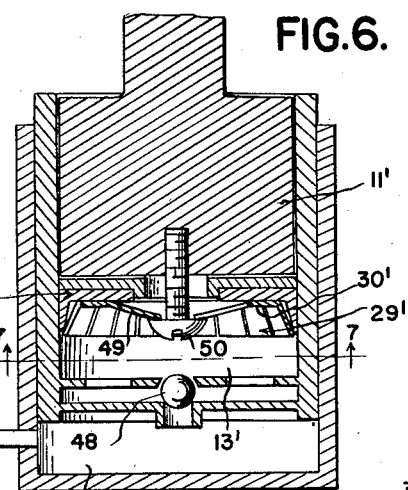
Figure 6 is a vertical sectional view through a slightly modified form of construction.
Figure 3:
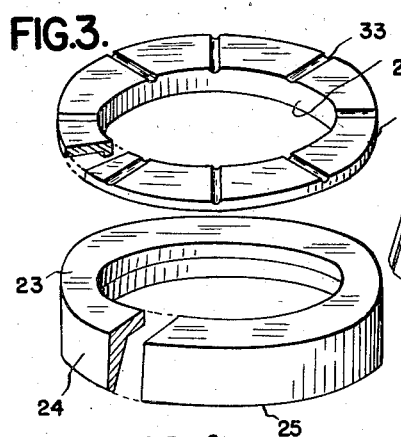
Figure 3 is a perspective view of the protecting ring for the sealing ring.
Figure 4:
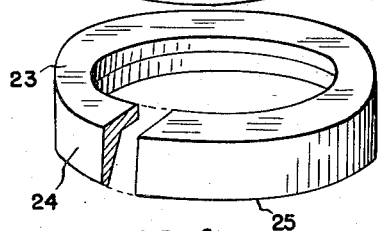
Figure 4 is a perspective view of the sealing ring.
Figure 5:
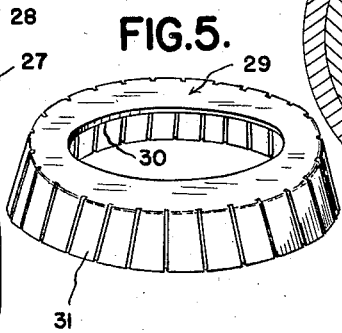
Figure 5 is a perspective view of the spring provided in combination with the sealing ring to urge the lip of the latter outwardly into engagement with the cylinder walls.
Figure 7:
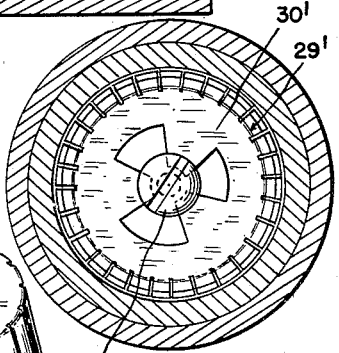
Figure 7 is a cross sectional view taken substantially on the plane indicated by the line 7—7 of Figure 6.

In the embodiment of the invention illustrated in Figure 6, I have shown a tappet construction differing principally from the one previously described in that a hydraulic fluid medium is supplied to the chamber 13' under pressure. As shown, a fluid pressure supply line 45 communicates with a reserve chamber 46 and the latter, in turn, communicates with the chamber 13' beneath the piston 11' through the medium of a passage 47 controlled by a check valve 48. In this construction, the pressure of the fluid in the chamber 13' takes the place of the spring 17 in moving the piston 11' upwardly to elongate the tappet.

A seal 22' is also provided in this construction and this seal is identical to the seal 22, previously discussed, with the exception that it is secured to the bottom of the piston. As shown in Figure 6, the base 30' of the cup-shaped spring 29' is fashioned to provide a plurality of spring fingers 49 which cooperate with a screw 50 threaded into the lower end of a piston to secure the seal in position. With the above exceptions, the function of the tappet is identical to the first described form of the invention.

Thus, from the foregoing, it will be observed that I have provided a relatively simple inexpensive seal capable of being readily assembled and effective to provide a fluid-tight seal between relatively slidable telescopically engageable parts. It will also be noted from the foregoing that I have provided a seal particularly applicable to hydraulic valve tappets in that it renders it possible to reduce the cost of manufacture of the tappets and at the same time provide highly efficient operation.

What I claim as my invention is:

1. A seal for the clearance between a piston and a cylinder, comprising a cup-shaped metallic member movable with the piston and having an annular deformable lip of an alloy of tin base bearing metal slidably engaging the cylinder wall, and means yieldably urging the lip throughout its circumference into continuous engagement with the cylinder wall.

2. A seal for the clearance between a piston and a cylinder, comprising a cup-shaped metal sealing member movable with the piston and having an annular lip at the free edge engageable with the cylinder wall, the flange of said sealing member being formed of ductile metal sufficiently soft that any internal force in the flange tending to counteract expansion of the lip into engagement with the cylinder walls is reduced to a minimum, and a cup-shaped spring metal element fitted within the cup-shaped sealing member under tension with the free edge portion engageable with the inner side of the lip to urge the outer side thereof into frictional engagement with the cylinder wall.

3. A seal for the clearance between a piston and a cylinder, comprising a sealing member movable with the piston and having an axially extending flange of ductile metal forming a continuation of the side wall of the piston, the flange being formed of metal sufficiently soft that any internal force in the flange tending to counteract expansion of the lip into engagement with the cylinder walls is reduced to a minimum, and an element having an annular spring metal expanding portion located substantially in the confines of the annular flange in engagement with the inner side of the free edge of said flange to expand the latter edge into frictional contact with the cylinder wall.

4. A seal for the clearance between a piston and a cylinder, comprising a cup-shaped metal sealing member movable with the piston and having an annular lip at the free edge engageable with the cylinder wall, the flange of said sealing member being formed of ductile metal sufficiently soft that any internal force in the flange tending to counteract expansion of the lip into engagement with the cylinder walls is reduced to a minimum, and a cup-shaped spring metal element fitted within the cup-shaped sealing member and having an annular flange composed of a plurality of closely spaced spring metal fingers engageable with the inner side of the lip to urge the outer side thereof into frictional contact with the cylinder.

5. A seal for the clearance between a piston and a cylinder, comprising a cup-shaped member having an annular lip of such soft metal as to permit expanding the same into engagement with the cylinder wall under relatively light pressures, and a cup-shaped spring metal member located in the cup-shaped sealing member and having a plurality of spring metal tongues engageable with the lip of the cup-shaped sealing member to provide a substantially continuous backing for said lip and effective to urge the lip into wiping engagement with the cylinder wall.

6. A seal for the clearance between a piston and a cylinder, comprising a cup-shaped member having an annular lip of such soft metal as to permit expanding the same into engagement with the cylinder wall under relatively light pressures and having the minimum resiliency whereby the internal force counteracting expansion of the lip into engagement with the cylinder wall is reduced to a minimum, means applying a pressure on the lip to urge the same into wiping engagement with the cylinder wall, and spring means for clamping the cup-shaped member to the piston.

7. A seal for the clearance between a piston and a cylinder, comprising a ring of ductile metal located between the piston and cylinder adjacent one end of the latter, said ring carried by one of the latter members and slidably engageable with the adjacent surface of the other of said members and possessing sufficient ductility to retain any foreign matter tending to escape past the ring.

8. A seal for the clearance between a piston and a cylinder, comprising a pair of rings of ductile metal carried by the piston at axially spaced points and slidably engageable with the adjacent surface of the cylinder, said rings possessing sufficient ductility to readily conform to said surface and to collect any foreign matter attempting to escape past the piston in either direction.

9. A seal for the clearance between a piston and a cylinder, comprising a ring movable with the piston and having an annular axially extending lip of a ductile metal alloy composed predominantly of tin base bearing metal and frictionally engageable with the cylinder wall axially beyond the working face of the piston.

10. The combination with a cylinder and a piston reciprocably mounted in the cylinder, of a seal resisting the escape of fluid past the piston in one direction of movement of the latter in the cylinder including a member of ductile metal movable with the piston and having a cylindrical surface slidably engaging the inner wall of the cylinder, and means preventing relative rotation of the piston and cylinder during reciprocation of the piston in said cylinder.

11. A seal for the clearance between a piston and a cylinder, comprising a cup-shaped metal member carried by the piston and provided with an annular flange of ductile metal having a lip normally urged into wiping engagement with the cylinder wall, the ductile metal forming the flange being sufficiently soft that any internal force in the flange tending to counteract expansion of the lip of the flange into engagement with the cylinder wall is reduced to a minimum.

ERNEST L. DAYTON.